(12) United States Patent
Bronskill

(10) Patent No.: US 6,201,549 B1
(45) Date of Patent: Mar. 13, 2001

(54) SYSTEM AND METHOD FOR DRAWING AND PAINTING WITH BITMAP BRUSHES

(75) Inventor: John Bronskill, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/224,237

(22) Filed: Dec. 30, 1998

(51) Int. Cl.$^7$ .................................................. G06T 11/20
(52) U.S. Cl. ......................... 345/441; 345/442; 345/150; 345/153
(58) Field of Search ................................. 345/441, 142, 345/443, 442, 467, 468, 469, 141, 418, 439, 150, 153, 126, 437; 348/442, 441; 318/568.19, 568.11; 250/206.2, 206.1; 365/238; 707/502; 434/85, 88; 72/380

(56) References Cited

U.S. PATENT DOCUMENTS

| | | | |
|---|---|---|---|
| 4,774,516 | * 9/1988 | Henri et al. | 342/185 |
| 4,897,638 | * 1/1990 | Kokunishi et al. | 345/142 |
| 4,952,051 | * 8/1990 | Lovell et al. | 352/87 |
| 5,155,813 | * 10/1992 | Donoghue et al. | 345/179 |
| 5,216,755 | * 6/1993 | Walker et al. | 345/432 |
| 5,276,787 | * 1/1994 | Searby | 345/432 |
| 5,361,333 | * 11/1994 | Ahlquist, Jr. et al. | 345/442 |
| 5,432,896 | * 7/1995 | Hwong et al. | 345/429 |
| 5,488,204 | * 1/1996 | Mead et al. | 178/18.06 |
| 5,506,603 | * 4/1996 | Kawano et al. | 345/154 |
| 5,548,706 | * 8/1996 | Koizumi et al. | 707/502 |
| 5,615,321 | * 3/1997 | Corn | 345/433 |
| 5,717,845 | * 2/1998 | Patrick et al. | 345/438 |
| 5,767,860 | * 6/1998 | Zimmer et al. | 345/441 |
| 5,847,712 | * 12/1998 | Salesin et al. | 345/430 |
| 6,064,388 | * 5/2000 | Reyzin | 345/418 |

OTHER PUBLICATIONS

Hsu, Siu Chi et al. "Drawing and Animation Using Skeletal Strokes", Computer Graphics Proceedings, Annual Conference Series, 1994, ACM, Jul. 1994, pp. 109–118.

Hsu, Siu Chi et al., "Skeletal Strokes", UIST'93 Proceedings of the ACG Siggraph and Sigchi Symposium on User Interface Software and Technology, ACM, Nov. 1993.

Foley J. et al. *Computer Graphics Principles and Practice* $2^{nd}$ Edition, Chapter 11.2 "Parametric Cubic Curves", Addison–Wesley, 1990, pp. 478–491.

Schneider, Philip J., "Solving the Nearest–Point–on–Curve Problem" in *Graphics Gems* (A. Glassner ed.), Academic Press, Inc., 1990.

Rosenfeld A., et al. *Digital Picture Processing*, vol. 2, Chapter 9.3 "Geographic Transformation", Academic Press, 1982, pp. 31–36.

Schmacher, D., "General Filtered Image Rescaling", in *Graphics Gems III* (D. Kirk ed.), Academic Press Inc., 1992, pp. 8–16, 414–424.

Farin, G., *Curves and Surfaces for CAGD—A Practical Guide*, $4^{th}$ Edition, Academic Press, 1992.

Porter T., et al. "Compositing Digital Images", *Computer Graphics*, vol. 18, No. 3, Jul. 1984, pp. 49–55.

* cited by examiner

Primary Examiner—Jeffery Brier
Assistant Examiner—Thu-Thao Hawan
(74) Attorney, Agent, or Firm—Leydig, Voit & Mayer Ltd.

(57) ABSTRACT

A method for drawing a paint stroke with a bitmap brush having pixels located at locations definable in a Cartesian coordinate system. The paint stroke is created by defining a path of a guide line, the path having an arc-length and the guide line having a thickness, and scaling the bitmap brush as a function of the arc-length of the path and the thickness of the guide line. The bitmap brush is then transformed such that the x-axis of the bitmap brush generally aligns with the path and the y-axis of the bitmap brush generally aligns with an instantaneous normal to the path such that the bitmap brush is warped to the guide line.

36 Claims, 13 Drawing Sheets

SYSTEM AND METHOD FOR DRAWING AND PAINTING WITH BITMAP BRUSHES

TECHNICAL FIELD

This invention relates generally to digital drawing and painting and, more particularly, relates to a system and method for drawing and painting with bitmap brushes.

BACKGROUND OF THE INVENTION

Since the first incarnation of digital paint systems, there has been a lot of work done to make synthesized paint strokes look like those created using traditional paint and drawing tools, for example, watercolor brushes, chalk strokes, etc. In particular, two known commercial products, "PAINTER" and "EXPRESSION" sold by MetaCreations, provide tools for use in creating "natural media" digital painting and drawing. "PAINTER" is raster based and uses procedural algorithms to generate paint strokes that give the appearance that they have been created by their real world counterpart. "EXPRESSION" is vector based and uses "skeletal strokes" technology.

Skeletal strokes, described in S. C. Hsu and I. H. H. Lee, "Drawing and Animation Using Skeletal Strokes," SIGGRAPH '94 Conference Proceedings, Jul. 1994 and S. C. Hsu, I. H. H. Lee, and N. E. Wiseman, "Skeletal Strokes," UIST '93 Proceedings of the ACM SIGGRAPH and SIGCHI Symposium on User Interface Software Technology, Nov. 1993, utilizes a vector graphics realization of the brush and stroke metaphor using arbitrary pictures as "ink." Generally, defining a skeletal stroke requires drawing an instance of the flesh, which could be any arbitrary picture, around a reference line with a right-angle bend. The reference line provides a reference x-axis for the points specifying the position of the flesh; a reference thickness provides a scale to specify the lateral distance of the these points from the reference line. A picture so anchored to a single reference line defines a skeletal stroke. Once a skeletal stroke is defined, it can be applied along any arbitrary path by simply drawing the path and aligning the reference line of the skeletal stroke with the given path. In this manner, the flesh is distorted (stretched, compressed, bent and/or sheared) to generally follow the path.

While these tools generally work for their intended purpose, both applications tend to fall a bit short in terms of the realism of the paint stroke synthesized. In particular, because of the procedural nature of "PAINTER" and the vector nature of "EXPRESSION", the paint strokes produced lack the subtle flaws and detail of real brush strokes or real objects. Accordingly, a need exists for an apparatus and method for digitally producing brush strokes that appear to be hand drawn and painted.

SUMMARY OF THE INVENTION

In accordance with this need, the subject invention generally allows a user to paint and draw with a scanned bitmap brush that is warped along the path of a previously defined guide line. The bitmap brush may be an "artistic brush" in which case the brush 2 0 is a scanned bitmap of an actual artistic stroke created in a variety of styles including watercolor, oil, chalk, crayon, ink, etc. Additionally, the bitmap brush may be a "photo brush" in which case the brush is a scanned photo of an object such as a rope, wire, chain, etc. The bitmap brush is warped along the defined guide line thus producing a highly realistic artistic or photo stroke. In this manner, the approach taken by the subject invention allows a user to paint along any path and stay completely within the electronic domain. Furthermore, the subject invention has the advantage of allowing a user to paint and draw with a wide variety of strokes, instead on ones that merely consist of a solid color, while yielding realistic and visually pleasing results.

More particularly, the invention may be described as a method for drawing a paint stroke with a bitmap brush having pixels located at locations definable in a Cartesian coordinate system. The paint stroke is created by defining a path of a guide line, the path having an arc-length and the guide line having a thickness, and scaling the bitmap brush as a function of the arc-length of the path and the thickness of the guide line. The bitmap brush is then warped to the guide line by transforming the x-axis and the y-axis of the bitmap brush. In particular, the x-axis of the bitmap brush is transformed so that it generally aligns with the path and the y-axis of the bitmap brush is transformed so it generally aligns with an instantaneous normal to the path.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
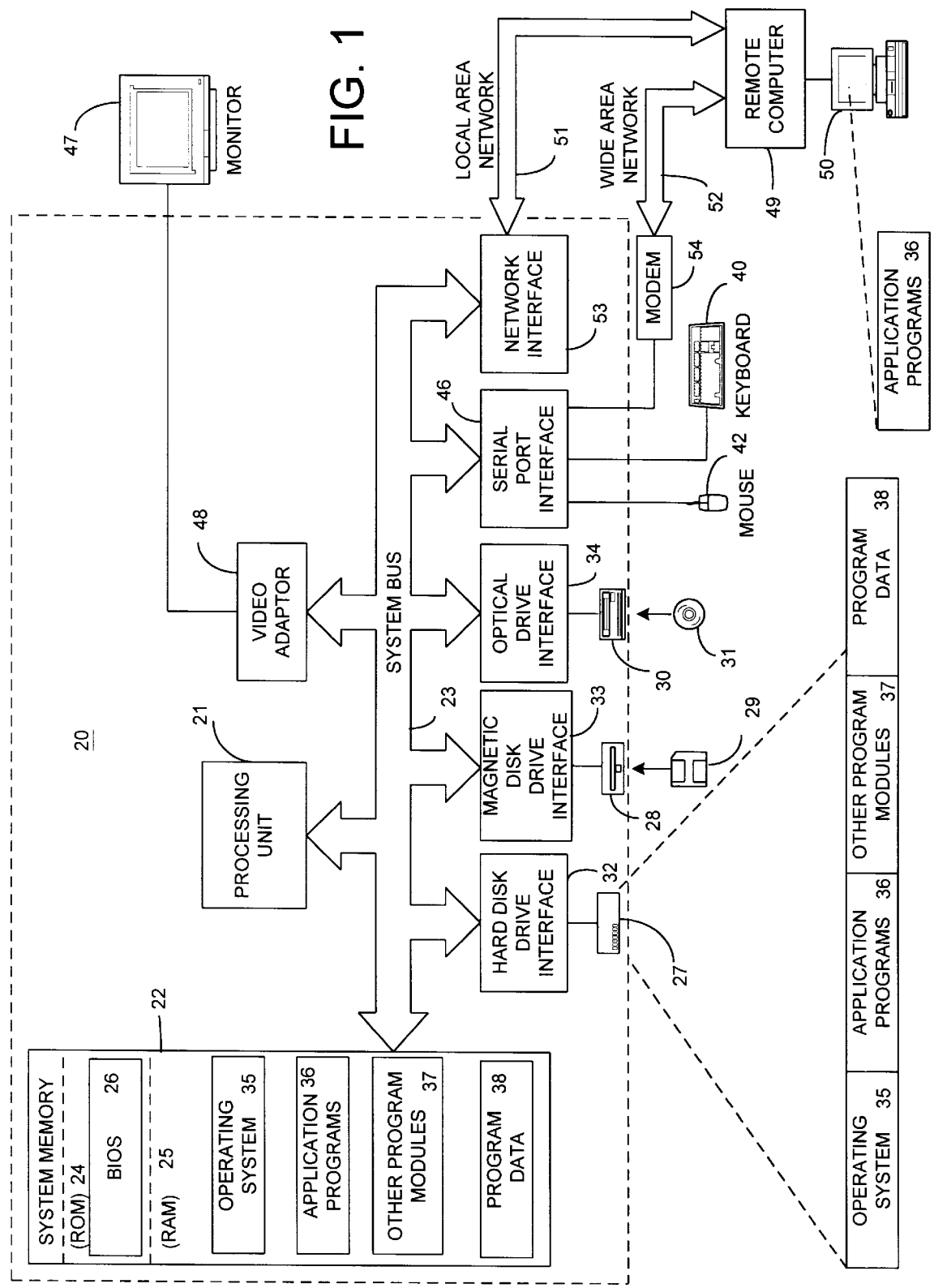
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

In accordance with the invention, a system and method is provided for allowing a user to paint and draw with a scanned bitmap brush. To create the paint stroke, the bitmap brush is mapped to and warped along the path of a predefined guide line stroke.

Figure 2:
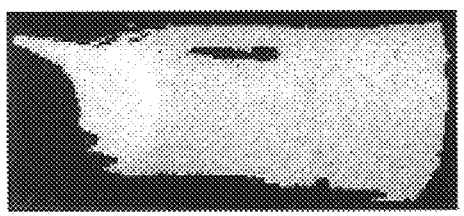
FIG. 2 is an illustration of a "sumi-e" bitmap brush.
Figure 3:
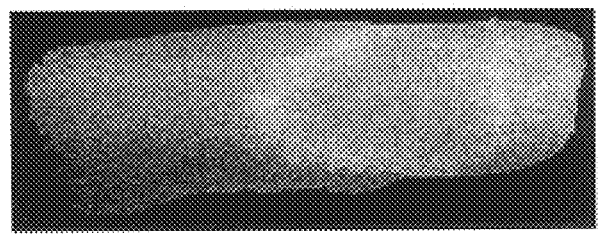
FIG. 3 is an illustration of a "watercolor" bitmap brush.
Figure 4:
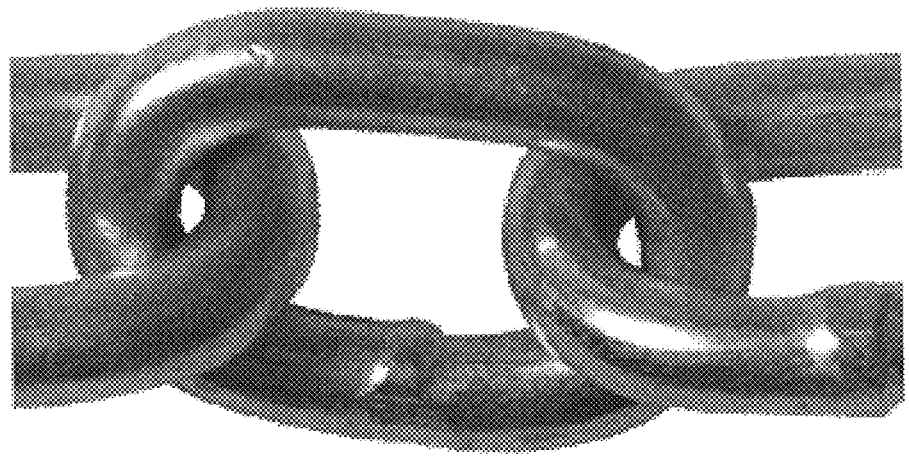
FIG. 4 is an illustration of a "chain" bitmap brush.
Figure 5:
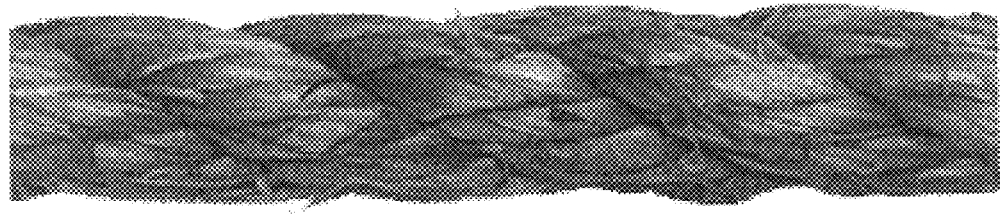
FIG. 5 is an illustration of a "rope" bitmap brush.

The bitmap brush may be an "artistic brush" that is a scanned bitmap image of an actual artistic stroke created in a variety of styles including watercolor, oil, chalk, crayon, ink, etc. An exemplary "sumi-e" bitmap brush is illustrated in FIG. 2 while an exemplary "watercolor" bitmap brush is illustrated in FIG. 3. Additionally, the bitmap brush may be a "photo brush" that is a scanned bitmap image of an object such as a rope, wire, chain etc. An exemplary "chain" bitmap brush is illustrated in FIG. 4 while an exemplary "rope" bitmap brush is illustrated in FIG. 5. While it is preferred that the bitmap brushes be created using well known scanning processes, it will be appreciated that other known methods are available for creating the bitmap brush images. Accordingly, the invention is not intended to be limited to any particular manner by which the bitmap brushes are created.

The predefined guide lines over which the bitmap brushes are mapped to create the artistic stroke can be drawn using any currently available, digital painting tool, be extracted from provided clip art images, etc. Additionally, the predefined guide lines can be of any thickness and include any number of curves. Accordingly, the invention is not intended to be limited to any particular manner by which the predefined guide lines are created.

Figure 6:
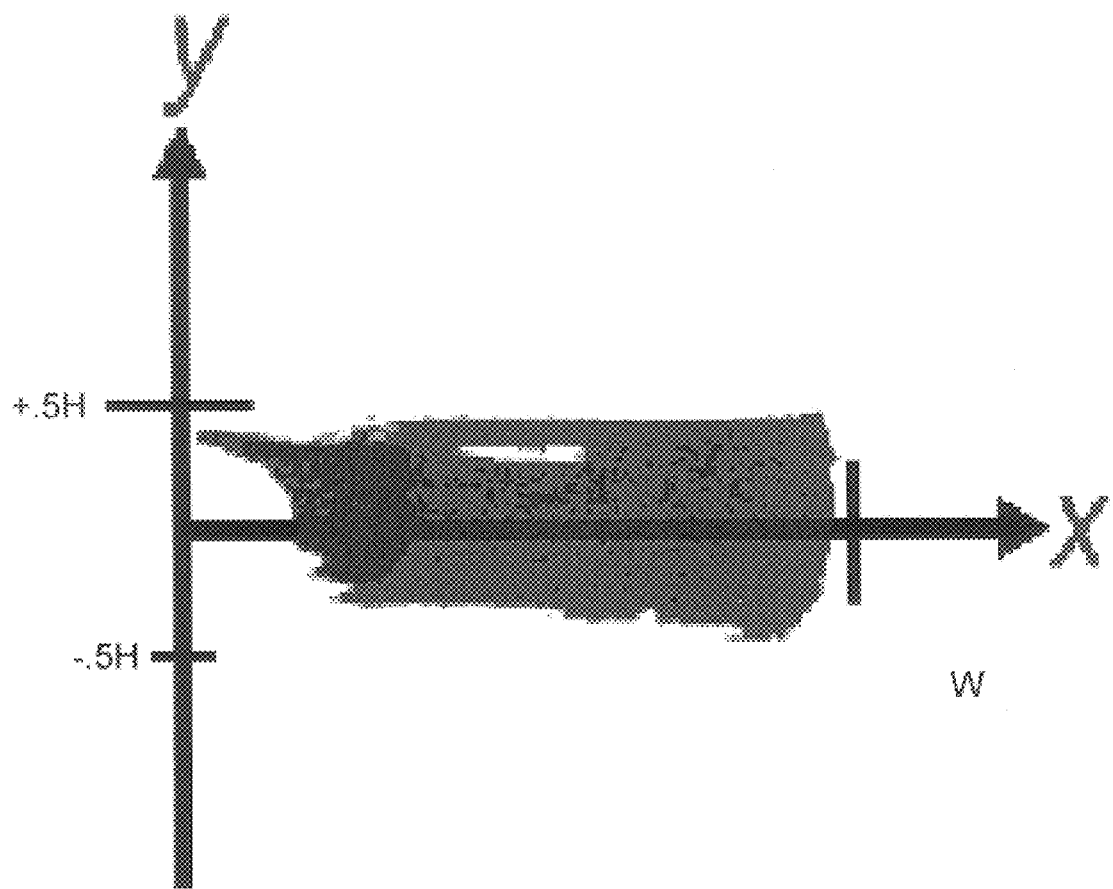
FIG. 6 is an illustration of the "sumi-e" bitmap brush of FIG. 2 disposed in a Cartesian coordinate system.
Figure 7:
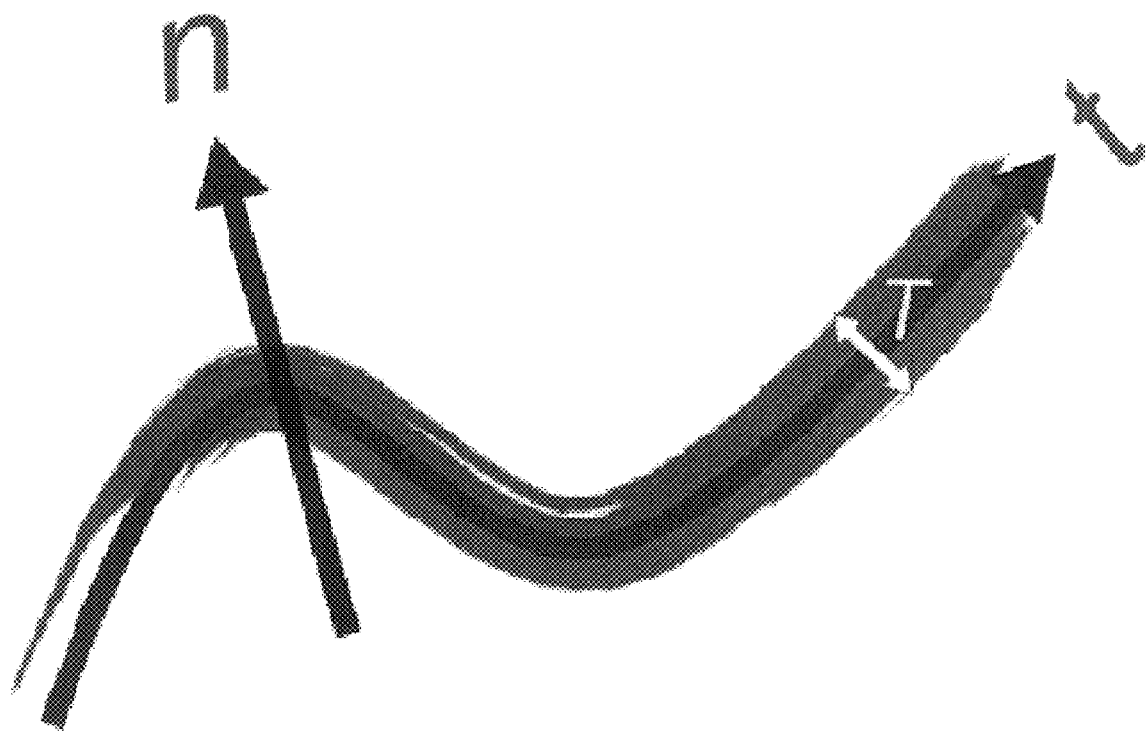
FIG. 7 is an illustration of the "sumi-e" bitmap brush of FIG. 2 warped along a guide line after undergoing the transformation process set forth in FIG. 10 or FIG. 12.

The mapping and warping of the generally rectangular bitmap brush along the predefined guide line to create the paint stroke is generally accomplished by transforming the Cartesian (x,y) coordinate system of the bitmap brush such that the x-axis of the bitmap brush is aligned with the path Q(t) of the guide line and the y-axis of the bitmap brush is aligned with the instantaneous normal n to the path Q(t) of the guide line. The pre-transformation coordinate system for a "sumi-e" bitmap brush having a width in pixels W and a height in pixels H is illustrated in FIG. 6. The transformed "sumi-e" bitmap brush that has been warped along the guide line having a width in pixels T to create a paint stroke is illustrated in FIG. 7. As seen in FIG. 7, the instantaneous normal n is perpendicular to the path Q(t) of the guide line at each point $P_t$ that comprises the path Q(t). An exemplary method by which such a coordinate transformation may be performed is described in S. C. Hsu, I.H. H. Lee, and N. E. Wiseman, "Skeletal Strokes," USIT '93 Proceedings of the ACM SIGGRAPH and SIGCHI Symposium on User Interface Software and Technology, Nov. 1993.

Figure 8:
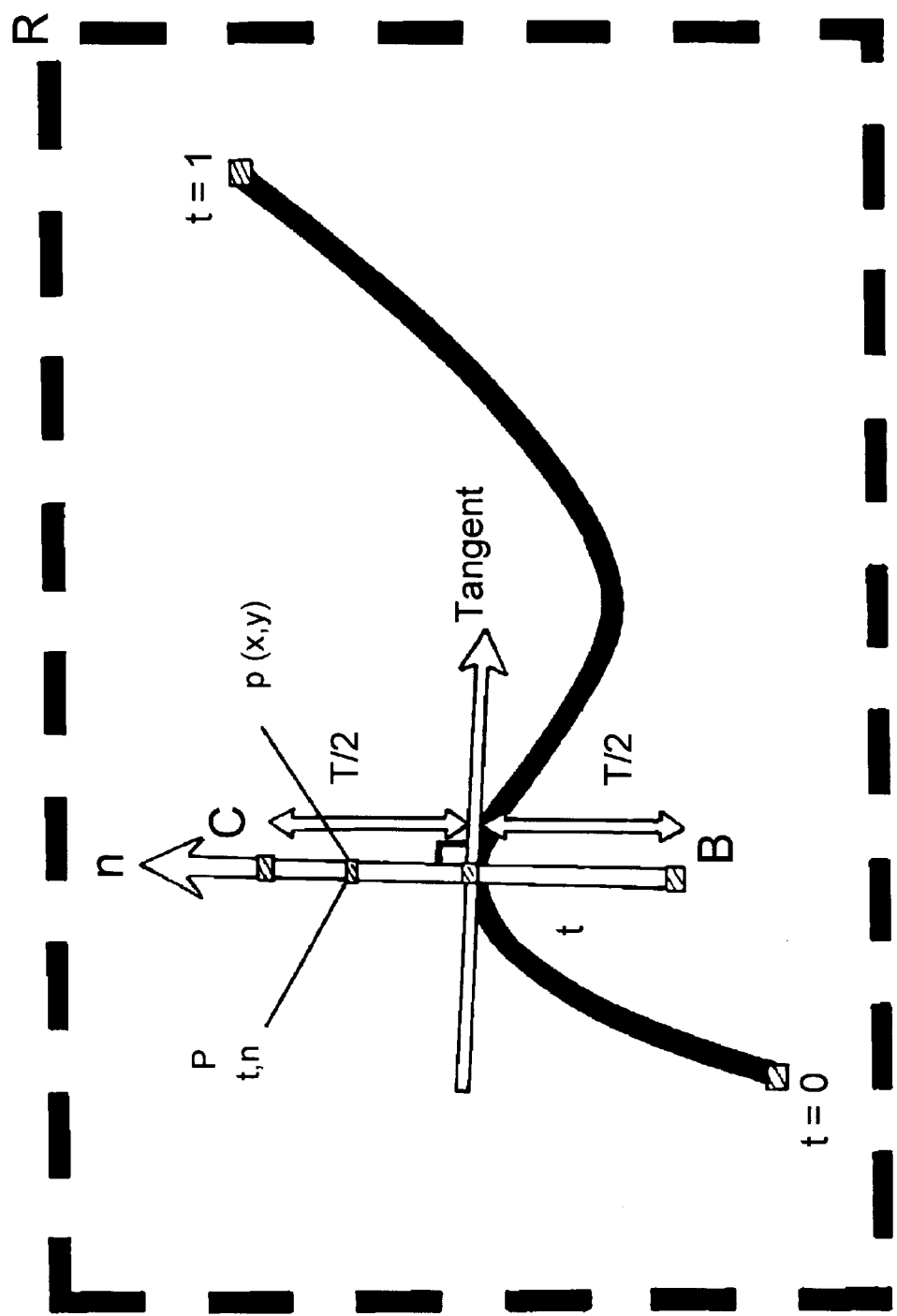
FIG. 8 is a graphical representation of a forward approach to mapping a bitmap brush image to a guide line.

More specifically, to map and warp the bitmap brush to the two dimensional continuous curves of the guide line, the path Q(t)={x(t),y(t)} of the guide line is first expressed in parametric form with parameter t ($0 \leq t \leq 1$) such that the start of the path Q(t) is at t=0 and the end of the path Q(t) is at t=1. This is illustrated in FIG. 8. A method for expressing the path Q(t) of a guide line in parametric form is described in greater detail in J. Foley, A. Van Dam, S. Feiner, and J. Hughes, "Computer Graphics Principles and Practice," $2^{nd}$ Edition, Addison-Wesley, 1990. Preferably, each guide line has a continuous first derivative Q'(t)={x'(t),y'(t)} and second derivative Q"(t)={x"(t),y"(t)}. A practical example of such a guide line is a two-dimensional Bezier curve of degree three (cubic).

Figure 9:
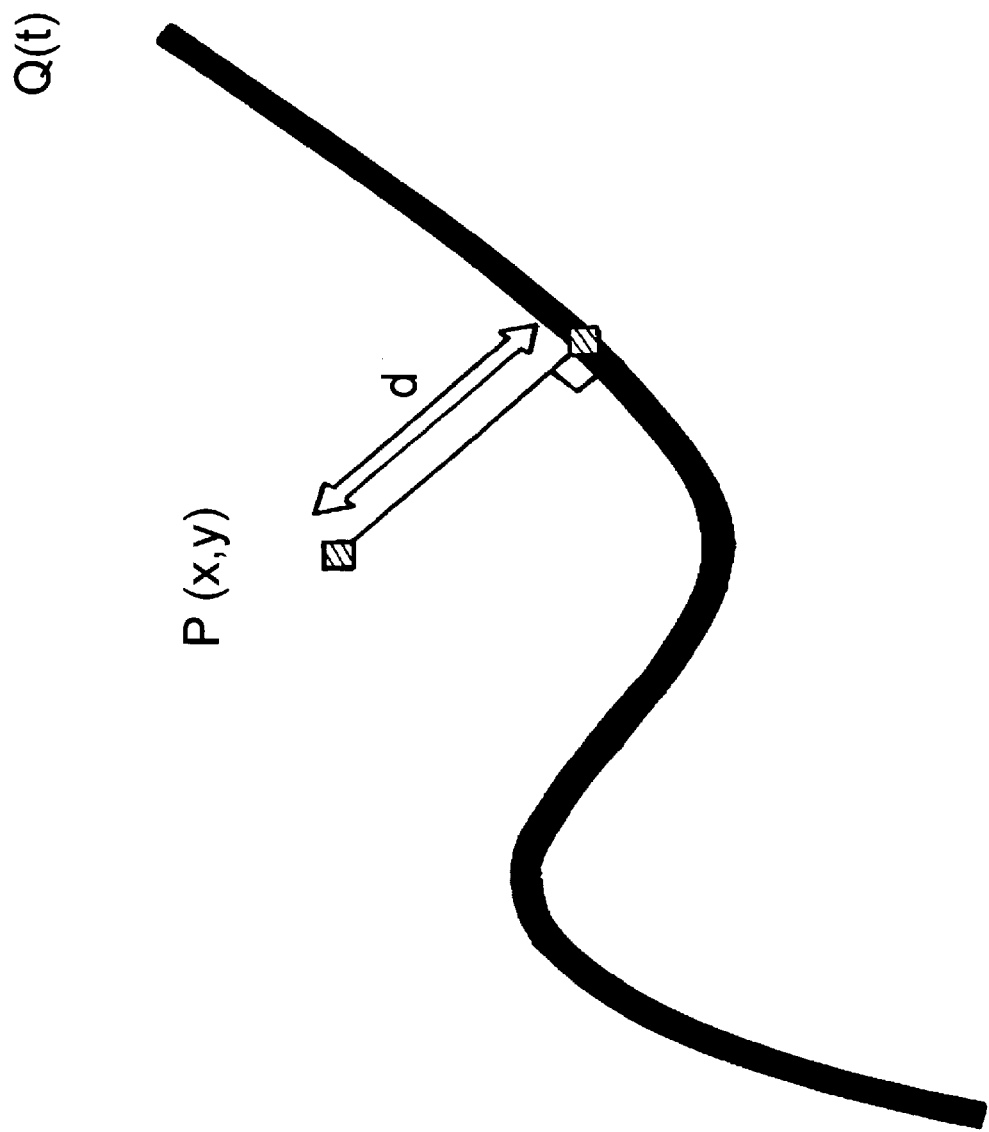
FIG. 9 is an illustration of the graphical representation of a point in the guide line in the Cartesian coordinate system.

Having defined the path Q(t) of the guide line in parametric form, the points $P_{t,n}$ that comprise the predefined guide line are defined. Letting W and H be the width and height of the bitmap brush in pixels, respectively, L be the arc length of the path Q(t) of the guide line in pixels, T be the thickness of the guide line in pixels, and R be a rectangular region that fully encloses the path Q(t) if it is drawn with a stroke thickness T, a point $P_{t,n}$ on the guide line a distance d from Q(t) can be defined by the expression:

$$P(x,y) = Q(t) + d\tilde{n}(t) \quad (1)$$

where $0 \leq t \leq 1, -T/2 \leq d \leq T/2$, and $\tilde{n}(t)$ is the unit normal vector to Q(t). The graphical representation of this definition of a point of the guide line is illustrated in FIG. 9. Expanding the equation, it can be expressed as:

$$P(x, y) = (x(t), y(t)) + d(y'(t) - x'(t))/\sqrt{x'^2(t) + y'^2(t)} \quad (2)$$

In this manner, each point $P_{t,n}$ that comprises the guide line can be mapped to a Cartesian coordinate location P(x,y) within the rectangle R.

Using the relationship between the points $P_{t,n}$ that define the guide line and the locations P(x,y) defining the rectangle, there are two alternative approaches that can be taken to complete the mapping of the pixels that comprise the bitmap brush to the points $P_{t,n}$ that comprise the guideline. Generally, in the forwarding mapping approach, equation (2) is used and t and d are varied over all possible values. In the backward mapping approach, the point P(x,y) is started with and t and d are solved for knowing x(t), y(t), x'(t), and y'(t).

Figure 10:
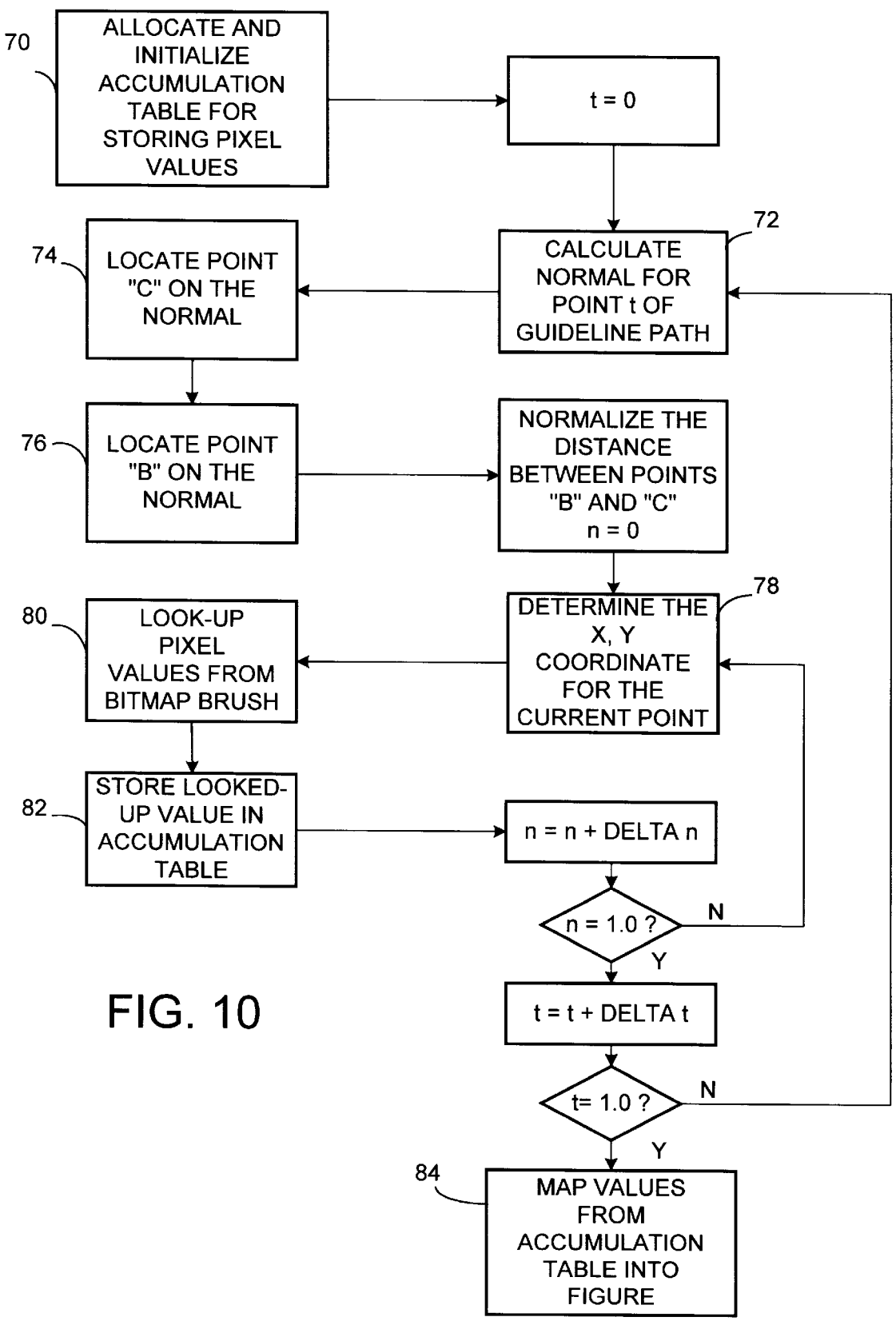
FIG. 10 is a flow chart diagram depicting the method for mapping a bitmap brush image to a guide line illustrated in FIG. 8.

Turning first to the forward mapping approach, illustrated in FIG. 8 and 10, an accumulation buffer in an accumulation table is allocated and initialized in step 70 for each pixel P(x,y) in the rectangle R. Then, from point t=0 (one end of the path Q(t)) to point t=1 (the opposite end of the path Q(t)) on the path Q(t) using steps of Δt, the normal vector n to the path Q(t) is calculated in step 72. As will be described in greater detail hereinafter, it is preferred that Δt be set as a function of the Radius of Curvature of Q(t) at t. As will be understood, the normal vector n is calculated by calculating the tangent vector to the path at t (the first derivative of the path evaluated at t) and then computing the vector perpendicular to the tangent. This is described in G. Farin, "Curves and Surfaces for CAGD—A Practical Guide," $4^{th}$ Edition, Academic Press, 1997.

Once the normal n has been calculated, the P(x,y) location of a point C on the normal n that is a distance of T/2 pixels from the path Q(t) is found in step 74. Similarly, the P(x,y) location of a point B on the normal n that is a distance of T/2 in the opposite direction of point C is calculated in step 76. Then, in step 78, the P(x,y) coordinate for each point $P_{t,n}$ on the normal n between point B and point C is calculated. Preferably, the distance from point B to point C is normalized such that the step 78 calculation is performed for each point $P_{t,n}$ on the normal n for n=0.0 (defined to be one of the points B, C) to n=1.0 (defined to be the other of the points B, C) as n is increased by Δn. In this manner, the above steps are repeated such that each point $P_{t,n}$ for $0 \leq t \leq 1$ and $0 \leq n \leq 1$ will have a corresponding P(x,y) coordinate within the rectangle R. For each of these points $P_{t,n}$ a bitmap brush pixel look-up is performed in step 80. The looked-up pixel values are stored in an accumulation table in step 82.

The bitmap brush pixel look-up is performed using the height (H pixels) and the width (W pixels) of the bitmap brush. As illustrated in FIG. 6, letting h be the normalized position along the y-axis of the bitmap brush, such that $0 \leq h \leq 1$, and l be the normalized position along the x-axis of the bitmap brush, such that $0 \leq l \leq 1$, the pixel within the bitmap brush that corresponds to $P_{t,n}$ is found at the X,Y address of the bitmap brush defined by X=l*W and Y=(h−0.5)*H. Specifically, the X,Y coordinate of the pixel in the bitmap brush is found by equating l to the value t for the point $P_{t,n}$ of interest and h to the value n for point $P_{t,n}$ of interest.

It will be appreciated that the (X,Y) address of the pixel within the bitmap brush derived from the foregoing procedure may not be a integral value. As a result, interpolation techniques such as nearest neighbor, bilinear, bicubic convolution or other methods should be employed. Examples of such interpolation techniques may be found in A. Rosenfeld and A. Kak, "Digital Picture Processing," Vol. 2, $2^{nd}$ Edition, Academic Press, 1982. Furthermore, to minimize distortion, it is preferred that the brush image should be scaled such that H is equal to T and W is equal to L. Known methods for performing these scaling operations are described in D. Schumacher, "General Filtered Image Rescaling," Graphics Gems III (D. Kirk ed.), Academic Press, Inc. 1992.

The accumulation table into which the looked-up pixel values are stored is configured to have an entry in the form of an accumulation buffer for each point P(x,y) in the rectangle R. Upon completion of the accumulation process for all values t and n, the values for the pixels stored in the accumulation table are mapped to the corresponding P(x,y) location within the rectangle R in step 84 to create the paint stroke. It will be understood that the pixels corresponding to the guide line are removed from the rectangle R during this mapping process.

Using the forward mapping approach and adaptive sampling in the t direction of the curve, many points P(x,y) may be visited more than once by points $P_{t,n}$ that comprise the guide line. This is especially true in concave areas of the guide line where normals n for different points t along the path Q(t) will intersect. Thus, when multiple points $P_{t,n}$ map to the same pixel P(x,y) within the rectangle R multiple looked-up pixel values will be added to the corresponding accumulation buffer within the accumulation table. It is desired, however, to use all of the samples to contribute to the paint stroke.

To use all samples in creating the paint stroke, it is preferred that the accumulation buffer for each pixel P(x,y) within the rectangle R be large enough to hold the sum of many looked-up pixel values. It is also preferred that the accumulation buffer have an additional register that stores the number of pixels that have been summed. For example, if the scanned brush image consists of pixels with four channels, Red, Green, Blue, and Alpha, and each channel value is stored in eight bits, each accumulation buffer should have four registers, one for each channel, that are thirty-two bits in length. The thirty-two bit length has been seen to be sufficient to sum the pixel values without an overflow resulting. A fifth register should also be provided for holding the number of pixels in sum. As described previously, upon initialization, all registers are preferably set to zero.

When the accumulation process for all values of t and n is complete, an average value is computed for each channel for each pixel location P(x,y) within the accumulation table. This is accomplished by taking the sum for each channel in an accumulation buffer and dividing it by the number of look-ups contributing to that sum. These average pixel values are utilized in the mapping process of step 84. It is, however, preferred that any location in the accumulation table that does not have any summed pixels not be used in the mapping process. In this manner, any images underlying the warped brush stroke image will not be overwritten with pixels having zeroed values.

Figure 11:
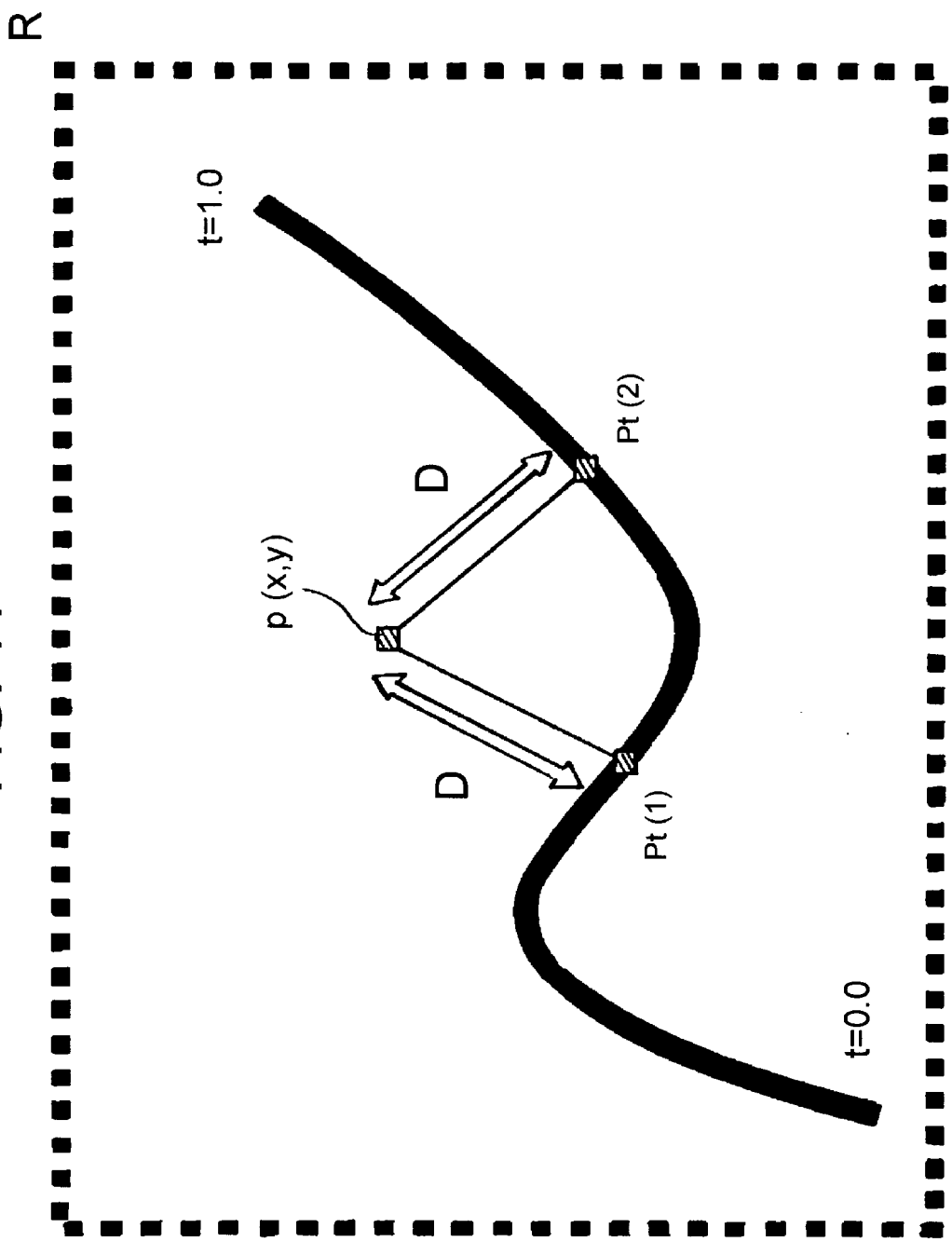
FIG. 11 is an illustration of a backward approach to mapping a bitmap brush image to a guide line.
Figure 12:
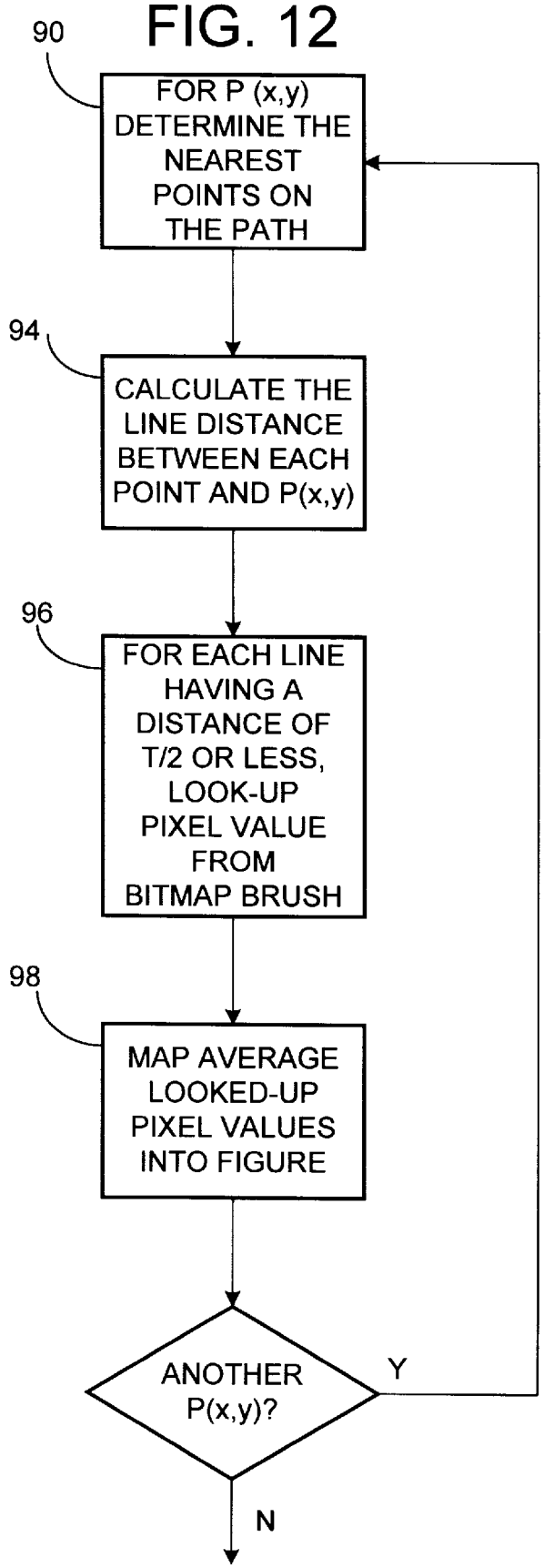
FIG. 12 is a flow chart diagram depicting the method for mapping a bitmap image to a guide line illustrated in FIG. 11.

In the backward mapping approach, illustrated in FIGS. 11 and 12, for each pixel P(x,y) within the rectangle R there is computed in step 90 the x different points Pt, from the points P, which comprise the path Q(t) that are nearest to P(x,y) in both Cartesian coordinates and parametric coordinates. An algorithm for performing this computation using Bezier curves may be found in P. J. Schneider, "*Solving the Nearest-Point-On-Curve-Problem,*" in Graphics Gem, Academic Press, 1990. Generally, for Bezier curves of degree three, there may be between zero and five points $Pt_x$ ($0 \leq x \leq 5$) on the path Q(t) that are nearest to P(x,y). Furthermore, it turns out that each line n joining P(x,y) to the points $Pt_x$ is perpendicular to the path Q(t). Having determined the points $Pt_x$, the distance D between P(x,y) and each point $Pt_x$ is calculated in step 94. If the distance D is less than T/2, for each line n the corresponding pixel from the bitmap brush image is looked-up in step 96 by equating l to the parametric location t on the path Q(t) corresponding to appropriate point $Pt_x$ through which the line n passes and h to the distance D normalized between T/2 (indicative of half of the thickness on one side of the guide line) and −T/2 (indicative of half of the thickness on the other side of the guide line) using the bitmap brush look-up procedure described previously. The returned pixel values for each point P(x,y) are preferably averaged to arrive at a single transform pixel value that is to be mapped in step 98 into the rectangle R as previously described.

Unlike the backward mapping approach where each pixel P(x,y) is ensured of being assigned a pixel value, it is possible that the forward mapping approach may miss some pixels P(x,y) and hit some pixels P(x,y) more often then necessary. To minimize this result, the sample rates Δt and Δn are preferably set small enough such that substantially every pixel in the guide line stroke is hit but not so small that excessive work is being done. Accordingly, a nominal value for Δt that is seen to be effective for relatively straight portions of the guide line path Q(t) is Δt=1.0/(1.8*L). As will be appreciated, however, this sample interval should be decreased as the radius of curvature of the guide line decreases. This results from the fact that the more the radius of curvature of the guide line decreases, the more the angles of the normals n for each point $P_t$ that comprise the curve will vary with respect to one another thus increasing the likelihood that pixels P(x,y) are missed or over sampled. A method for calculating the radius of curvature which can then be compared against a series of thresholds for adjusting the sampling rate Δt may be found in G. Farin, "*Curves and Surfaces for CAGD A Practical Guide,*" 4$^{th}$ Edition, Academic Press, 1997. A preferred sample rate along the normal n is preferably set as Δn=1.0/(1.3* T).

Additionally, when the desired thickness T/2 exceeds the radius of curvature along any point $P_t$ on the path Q(t), unwanted visual artifacts may result. When this condition occurs in the forward mapping process, point B or C (depending on which side of the path Q(t) is concave) is preferably limited to the center of curvature of the path Q(t) for that point $P_t$. In the backward mapping process, any pixel P(x,y) whose location is beyond the center of curvature is preferably not used in the backward mapping process. In this manner, unwanted visual artifacts may be minimized.

In an alternative embodiment, instead of stretching or shrinking the entire length of the bitmap brush to singularly, substantially match the arc length of the guide line, it is possible to have a bitmap brush that tiles in the x-direction. By way of example only, given a guide line having an arc length of 400 pixels and a bitmap brush having a length of 200 pixels, it is possible to map the bitmap brush twice to the guide line (the bitmap brush being mapped once along the path Q(t) from $0 \leq t \leq 0.5$ and once again from $0.5 \leq t \leq 1.0$). To minimize distortion, it is again preferred that the brush image be scaled such that H is equal to T and W is equal to L/(the number of tiles desired). This method of mapping the bitmap brush is especially desirable for bitmap photo brushes, such as the "chain" bitmap brush illustrated in FIG. 4, whereby the number of links of the chain ultimately drawn will increase as a function of the length of the guide line. As will be appreciated, using the formerly described method of mapping the bitmap brush, wherein the bitmap brush is singularly mapped over the entire arc length of the guide line, would result in the rendering of a chain having the same number of chain links as are in the scanned "chain" bitmap brush image but would cause those chain links to lengthen as a function of the arc length of the guide line.

Figure 13:
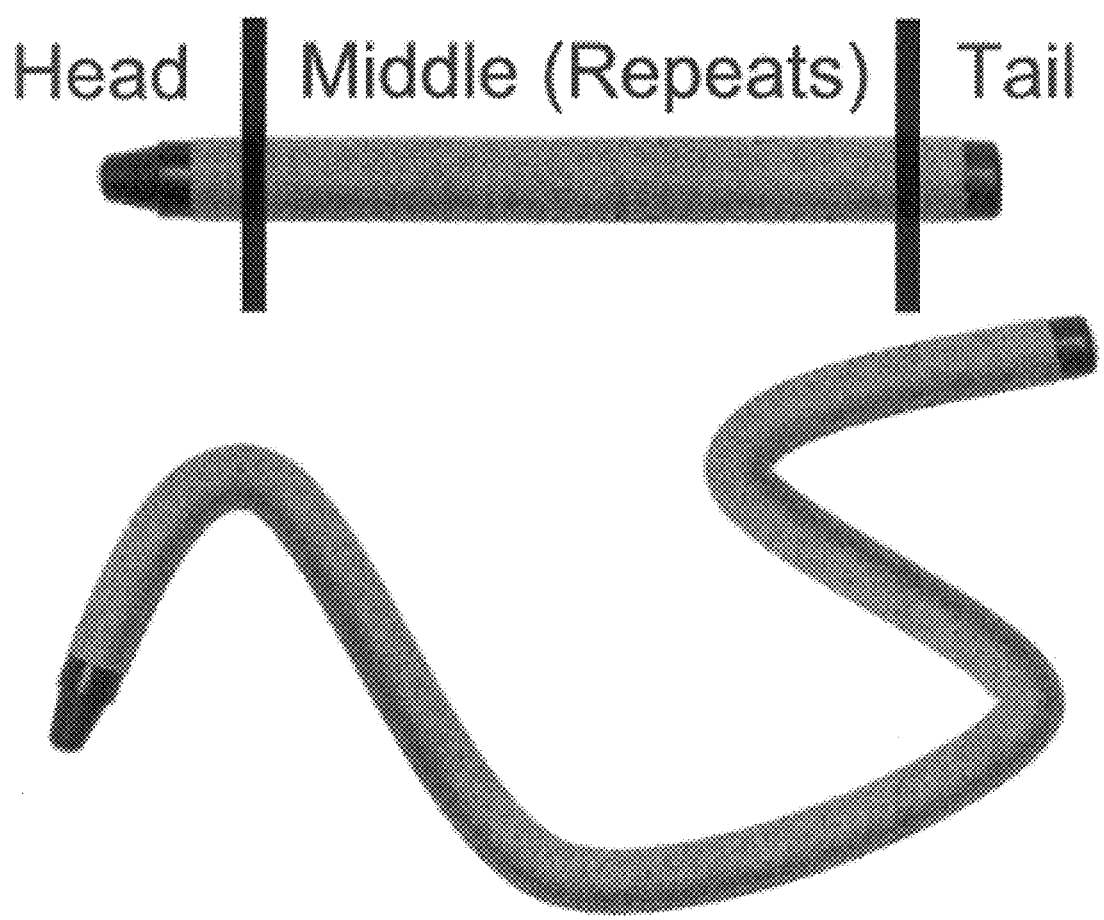
FIG. 13 is an illustration of a bitmap brush before and after being mapped to a guide line using a tiling method.

Still further, instead of mapping the entire length of the bitmap brush to the arc length of the guide line, it is possible to have a bitmap brush that has portions that tile in 10 the x-direction. By way of example only, it is possible to have a bitmap brush, such as the "crayon" bitmap brush illustrated in FIG. 13, in which the middle section is tiled in the manner previously described while the head and tail sections are mapped to corresponding end portions of the path Q(t) such that the head and tail sections of the bitmap brush are stretched in the x-direction as little as possible when the paint stroke is completed while generally maintaining the overall proportions of the end sections. As will be apparent, this is particularly desirable for use in connection with bitmap brushes that have unique head and tail images, for example, the crayon illustrated in FIG. 13, a rope having tassels at either end, etc.

Figure 14:
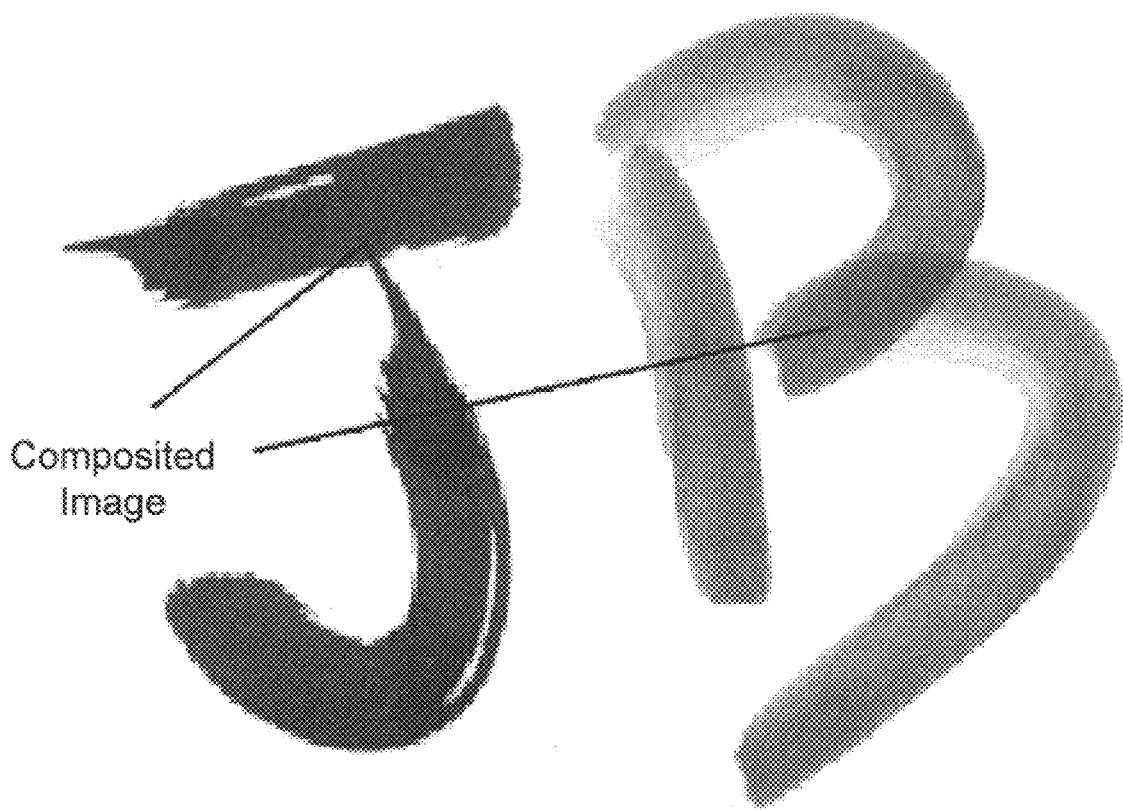
FIG. 14 is an illustration of a warped brush stroke showing the compositing of paint strokes.

As described previously, it is preferred that the pixels that comprise bitmap brush have color channels, such as RGB or CMYK, as well as an alpha (transparency) channel. In this manner, both the forward and mapping approaches result in a warped image that can be composited onto any background image. This also allows multiple strokes to be drawn in a back to front manner by compositing one over another as illustrated in FIG. 14.

Accordingly, the processes of mapping the averaged pixels P(x,y) into the rectangle R may be further described as compositing the pixels into the rectangle R.

Figure 15:
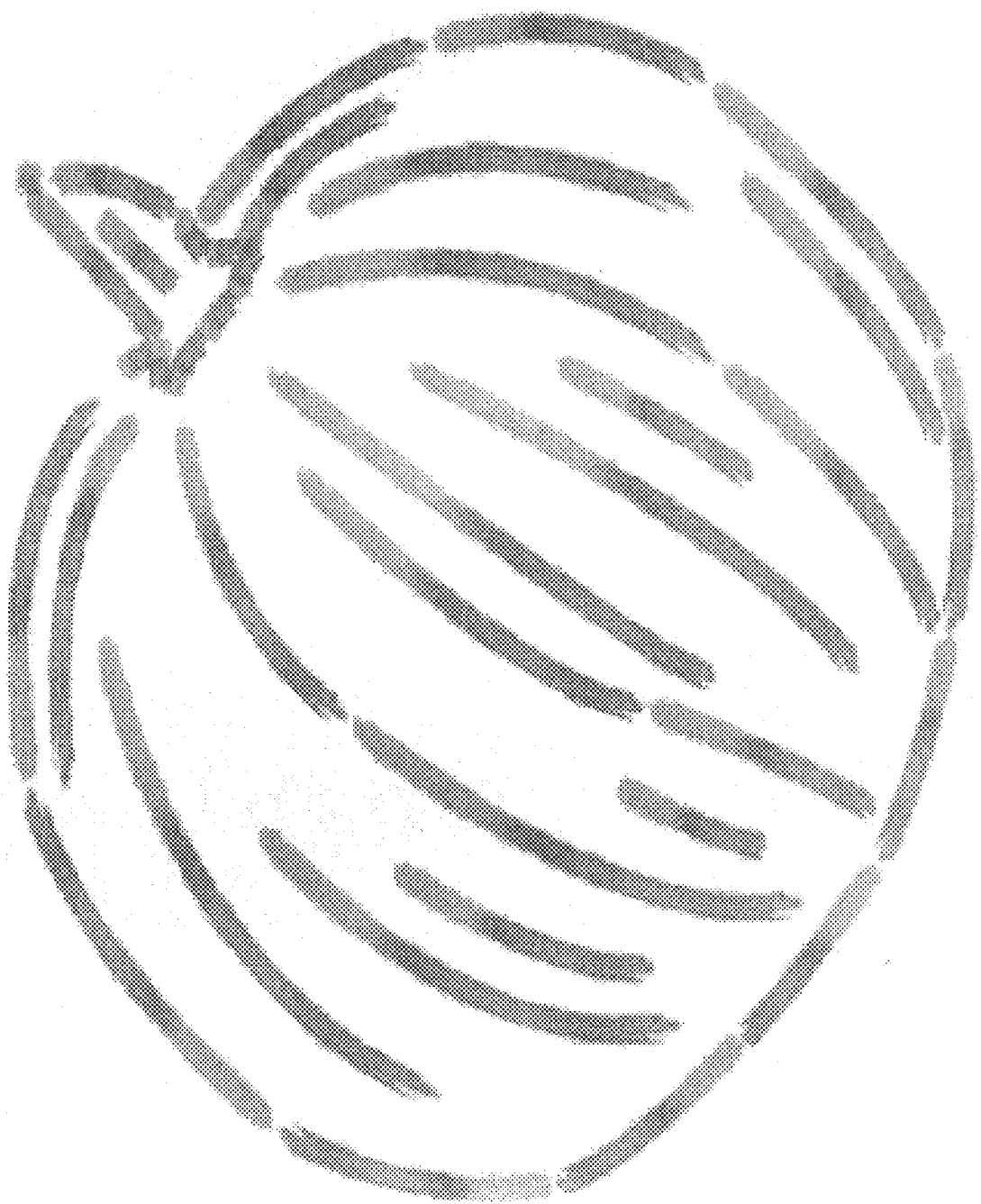
FIG. 15 is an illustration of warped brush strokes applied to a clip art image.

While the preceding discussion concerned the application of the forward and backward mapping approaches to single continuous paths, the approaches described can also be extended to piecewise paths and clipart that contain many paths. In the case of clipart the solution is to repeat the process on each separate path that comprises the clip art image. An exemplary result of utilizing this method on clip art is illustrated in FIG. 15. Furthermore, it is preferred that, should any paths overlap, the algorithm selected is applied to each of the paths in a back to front manner so that the paths that are higher in the stacking order are composited over paths that are lower in the stacking order.

For guide lines that are formed from one or more pieces (normally cubic Bezier curve pieces) a test is preferably used to determine if the described mapping approaches should be applied to each piece individually or if the described mapping approaches should think of the guide line as having a single path Q(t). Specifically, if the end point of the $n^{th}$ piece is the same as the starting point of the $n+1^{th}$ piece and the normalized first derivative or normalized tangent vector evaluated at the end of the $n^{th}$ piece is equal to that at the start of the $n+1^{th}$ piece, then the $n^{th}$ and the $n+1^{th}$ pieces have sufficient continuity that is preferable to think of the pieces as a single continuous piece. If this test is not met, however, it is preferred to treat the pieces as discontinuous and separately map the bitmap brush to the $n^{th}$ piece and the $n+1^{th}$ piece. Alternatively, in the case of a discontinuity, it would be possible to "miter" or otherwise join together the discontinuous ends of the pieces such that a single continuous path Q(t) is formed. An approach for creating virtual continuous paths from discontinuous pieces is described in C. S. Hsu, I. H. H. Lee, and N. E. Wiseman, "*Skeletal Stokes,*" UIST '93 Proceedings of the ACM SIGGRAPH and SIGCHI Symposium on User Interface Software and Technology, Nov. 1993.

Figure 16:
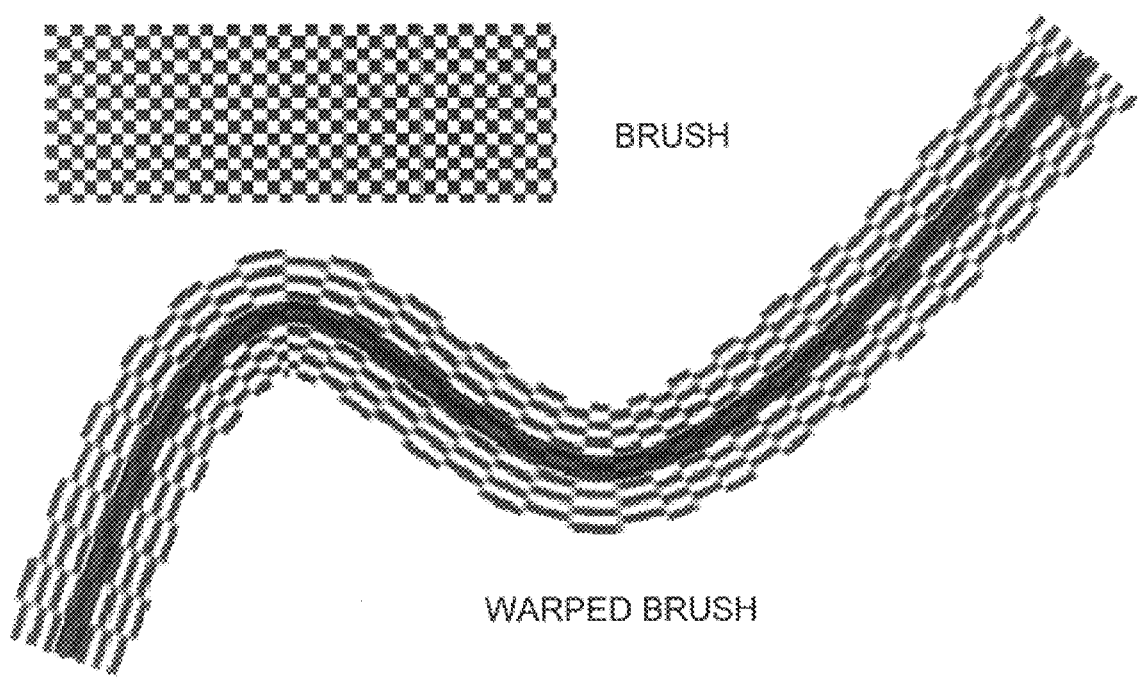
FIG. 16 is an illustration of a "checker board" bitmap brush before and after being mapped to a guide line.

As will be appreciated, the subject invention has the advantage of producing highly realistic artistic or photo stroke images. Among other things, this realism is accomplished by the aforementioned methods which particularly provide for the axial compression of the bitmap brush on the concave side and the axial stretching of the bitmap brush on the convex side when rendering the paint stroke. This is illustrated in FIG. 16 for a "checkered" bitmap brush.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

I claim:

1. A method for drawing a paint stroke with a bitmap brush having pixels located at locations definable in a Cartesian coordinate system, the method comprising the steps of:

defining a path of a guide line, the path having an arc-length and the guide line having a thickness;

scaling the bitmap brush as a function of the arc-length of the path and the thickness of the guide line; and transforming the bitmap brush such that the x-axis of the bitmap brush generally aligns with the path and the y-axis of the bitmap brush generally aligns with an instantaneous normal to the path such that the bitmap brush is warped to the guide line to create the paint stroke.

2. The method as recited in claim 1, wherein the step of defining the path comprises the further step of expressing the path in parametric form.

3. The method as recited in claim 2, wherein the step of transforming the bitmap brush comprises the further step of defining in a Cartesian coordinate system a point in the guide line and mapping a pixel selected from the bitmap brush to the point.

4. The method as recited in claim 1, wherein the step of transforming the bitmap brush further comprises the step of normalizing the arc-length of the path.

5. The method as recited in claim 1, wherein the step of transforming the bitmap brush further comprises the step of normalizing the width of the guide line.

6. The method as recited in claim 3, wherein the step of transforming the bitmap brush further comprises the steps of using a first distance, representative of an arc-length distance from an origin point on the path to a point on the path through which the instantaneous normal that passes through the guide line point passes, and a second distance, representative of a distance along the normal from an origin point on the normal to the guide line point, to look-up a pixel value in the bitmap brush and mapping the looked-up pixel value to the Cartesian coordinate that defines the guide line point.

7. The method as recited in claim 6, wherein the pixel value comprises color channel values and a transparency value.

8. The method as recited in claim 6, wherein the step of mapping further comprises the step of adding to an accumulation buffer corresponding to the Cartesian coordinate of the guide line point the looked-up pixel value and using the average of the sum within the accumulation buffer to create the paint stroke.

9. The method as recited in claim 6, wherein the step of using the first distance and the second distance to look-up a pixel value in the bitmap brush further comprises the steps of finding the pixel residing at the Cartesian coordinate representative of the first distance and the second distance and, if the first distance and the second distance do not yield integral values, using an interpolation technique to arrive at the looked-up pixel value.

10. The method as recited in claim 3, wherein the step of transforming further comprises the steps of deriving one or more first distances, representative of the corresponding arc-length distances from an origin point on the path to those points on the path nearest to the guide line point, and one or more second distances, representative of the corresponding distances along the normals passing through those points on the path nearest to the first point, from an origin point on the corresponding normal to the guide line point, to look-up one or more pixel values in the bitmap brush and mapping the average of the looked-up pixel values to the Cartesian coordinate that defines the guide line point.

11. The method as recited in claim 10, wherein the one or more pixel values each comprise a value corresponding to a color channel and a value corresponding to a transparency value.

12. The method as recited in claim 10, wherein the step of using the one or more first distances and the one or more second distances to look-up one or more pixel values in the bitmap brush further comprises the steps of finding the pixel residing at the Cartesian coordinate representative of the corresponding one or more first and second distances and, if the Cartesian coordinate is not an integral value, using an interpolation technique to arrive at the looked-up value.

13. The method as recited in claim 1, wherein the step of scaling the bitmap brush further comprises the step of scaling the x-axis of the bitmap brush such that an integral number of the scaled bitmap brushes substantially map to the arc-length of the path in a tiled fashion.

14. The method as recited in claim 1, wherein the step of scaling the bitmap brush further comprises the steps of scaling the x-axis of a portion of the bitmap brush such that an integral number of the scaled bitmap brush portions substantially map to a portion of the arc-length of the path in a tiled fashion.

15. The method as recited in claim 14, wherein the portion of the bitmap brush is a center part of the bitmap brush and the step of scaling further comprises the step of substantially maintaining the proportion of the ends of the bitmap brush with respect to the guide line.

16. The method as recited in claim 1, further comprising the step of extracting the guide line from a piece of clip art.

17. The method as recited in claim 1, wherein the step of defining a path further comprises the step of defining a single path over a plurality of non-continuous guide line segments.

18. The method as recited in claim 17, wherein the step of defining a path further comprises the step of joining the non-continuous guide line segments.

19. A method for drawing a paint stroke with a bitmap brush having pixels located at locations definable in a Cartesian coordinate system, the method comprising the steps of:
   defining in parametric form a path of a guide line, the path having an arc-length and the guide line having a thickness;
   scaling the bitmap brush as a function of the arc-length of the path and the thickness of the guideline;
   calculating, for a plurality of path points along the path, an instantaneous normal to the path at the corresponding one of the plurality of points; and, for each instantaneous normal calculated, performing the further steps of:
      determining, for a plurality of normal points along the instantaneous normal lying within the guide line, their locations in Cartesian coordinates; and, for each of the normal points, performing the further steps of:
         using a first distance representative of an arc-length distance from an origin point on the path to a point on the path through which the instantaneous normal passes and a second distance, representative of a distance along the instantaneous normal from an origin point on the instantaneous normal to the normal point, to look-up a pixel value and mapping to the Cartesian coordinate defined by the normal point the looked-up pixel value such that the bitmap brush is warped to the guide line to create the paint stroke.

20. The method as recited in claim 19, wherein the step of mapping comprises the further step of adding the looked-up pixel value to an accumulation buffer and mapping the average of the accumulation buffer to the Cartesian coordinate defined by the normal point.

21. The method as recited in claim 19, wherein the step of using a first distance further comprises the step of normalizing the arc-length of the path and normalizing the thickness of the guide line, the step of normalizing the thickness of the guide line comprises the further steps of determining the locations in Cartesian coordinates of a first point residing on the instantaneous normal a distance of half the thickness from the path in a first direction along the instantaneous normal and of a second point residing on the instantaneous normal a distance of half the thickness from the path in a second direction opposite the first direction and normalizing the distance between the first point and the second point.

22. The method as recited in claim 19, wherein the step of determining, for a plurality of normal points along the instantaneous normal lying within the guide line, their locations in Cartesian coordinates further comprises the step of excluding those normal points lying beyond the center of curvature.

23. The method as recited in claim 19, wherein the path points are selected at predetermined sample intervals along the path.

24. The method as recited in claim 23, wherein the predetermined sample interval is controlled as a function of the radius of curvature of the path.

25. A method for drawing a paint stroke with a bitmap brush having pixels located at locations definable in a Cartesian coordinate system, the method comprising the steps of:
   defining in parametric form a path of a guide line, the path having an arc-length and the guide line having a thickness;
   scaling the bitmap brush as a function of the arc-length of the path and the thickness of the guide line;
   defining in a Cartesian coordinate system the guide line points that comprise the guide line; and, for each guide line point defined, performing the further steps of:
      determining those path points residing on the path that are closest to the guide line point; for each path point determined, performing the further steps of:
         calculating an arc-length distance from an origin point on the path to the path point; calculating a normal distance from the guide line point to the path point; and using the arc-length distance and the normal distance to look-up a pixel value from the bitmap brush;
      calculating the average of all looked-up pixel values; and mapping the averaged pixel value to the Cartesian coordinate of the point to create the paint stroke.

26. The method as recited in claim 25, further comprising the step of excluding those guide line points whose location is beyond the center of curvature of the path from the step of defining in a Cartesian coordinate system the guide line points that comprise the guide line.

27. A computer-readable medium having computer-executable instruction for drawing a paint stroke with a bitmap brush having pixels located at locations definable in a Cartesian coordinate system, the computer-executable instructions performing the steps of:

defining a path of a guide line, the path having an arc-length and the guide line having a thickness;

scaling the bitmap brush as a function of the arc-length of the path and the thickness of the guide line; and transforming the bitmap brush such that the x-axis of the bitmap brush generally aligns with the path and the y-axis of the bitmap brush generally aligns with an instantaneous normal to the path such that the bitmap brush is warped to the guide line to create the paint stroke.

28. The computer-readable medium as recited in claim 27, wherein the step of defining the path comprises the further step of expressing the path in parametric form.

29. The computer-readable medium as recited in claim 28, wherein the step of transforming the bitmap brush comprises the further step of defining in a Cartesian coordinate system a point in the guide line and mapping a pixel selected from the bitmap brush to the point.

30. The computer-readable medium as recited in claim 29, wherein the step of transforming the bitmap brush further comprises the steps of using a first distance, representative of an arc-length distance from an origin point on the path to a point on the path through which the instantaneous normal that passes through the guide line point passes, and a second distance, representative of a distance along the normal from an origin point on the normal to the guide line point, to look-up a pixel value in the bitmap brush and mapping the looked-up pixel value to the Cartesian coordinate that defines the guide line point.

31. The computer-readable medium as recited in claim 30, wherein the step of mapping further comprises the step of adding to an accumulation buffer corresponding to the Cartesian coordinate of the guide line point the looked-up pixel value and using the average of the sum within the accumulation buffer to create the paint stroke.

32. The computer-readable medium as recited in claim 30, wherein the step of using the first distance and the second distance to look-up a pixel value in the bitmap brush further comprises the steps of finding the pixel residing at the Cartesian coordinate representative of the first distance and the second distance and, if the first distance and the second distance do not yield integral values, using an interpolation technique to arrive at the looked-up pixel value.

33. The computer-readable medium as recited in claim 29, wherein the step of transforming further comprises the steps of deriving one or more first distances, representative of the corresponding arc-length distances from an origin point on the path to those points on the path nearest to the guide line point, and one or more second distances, representative of the corresponding distances along the normals passing through those points on the path nearest to the first point, from an origin point on the corresponding normal to the guide line point, to look-up one or more pixel values in the bitmap brush and mapping the average of the looked-up pixel values to the Cartesian coordinate that defines the guide line point.

34. The computer-readable medium as recited in claim 33, wherein the step of using the one or more first distances and the one or more second distances to look-up one or more pixel values in the bitmap brush further comprises the steps of finding the pixel residing at the Cartesian coordinate representative of the corresponding one or more first and second distances and, if the Cartesian coordinate is not an integral value, using an interpolation technique to arrive at the looked-up value.

35. The computer-readable medium as recited in claim 27, wherein the step of scaling the bitmap brush further comprises the step of scaling the x-axis of the bitmap brush such that an integral number of the scaled bitmap brushes substantially map to the arc-length of the path in a tiled fashion.

36. The computer-readable medium as recited in claim 27, wherein the step of scaling the bitmap brush further comprises the step of scaling the x-axis of a portion of the bitmap brush such that an integral number of the scaled bitmap brush portions substantially map to a portion of the arc-length of the path in a tiled fashion, wherein the portion of the bitmap brush is a center part of the bitmap brush, and the step of substantially maintaining the proportion of the ends of the bitmap brush with respect to the guide line.

* * * * *

UNITED STATES PATENT AND TRADEMARK OFFICE
CERTIFICATE OF CORRECTION

PATENT NO. : 6,201,549 B1
DATED : March 13, 2001
INVENTOR(S) : John Bronskill

It is certified that error appears in the above-identified patent and that said Letters Patent is hereby corrected as shown below:

Column 1,
Line 60, "brush 20 is a" should read -- brush is a --.

Column 7,
Line 51, "Pt," should read -- $Pt_x$ --.
Line 52, "P," should read -- $P_x$ --.
Line 65, "l" should read -- $\ell$ --.

Column 8,
Line 13, "At" should read -- $\Delta t$ --.
Line 14, "An" should read -- $\Delta n$ --.

Signed and Sealed this

First Day of July, 2003

JAMES E. ROGAN
*Director of the United States Patent and Trademark Office*